United States Patent
Naik et al.

(10) Patent No.: US 12,104,685 B2
(45) Date of Patent: Oct. 1, 2024

(54) AXLE ASSEMBLY AND A UNITARY YOKE-SHAFT

(71) Applicant: ArvinMeritor Technology, LLC, Troy, MI (US)

(72) Inventors: Mahesh I. Naik, Bangalore (IN); Ramesh Ranjan, Bangalore (IN)

(73) Assignee: ArvinMeritor Technology, LLC, Troy, MI (US)

(*) Notice: Subject to any disclaimer, the term of this patent is extended or adjusted under 35 U.S.C. 154(b) by 162 days.

(21) Appl. No.: 17/899,013

(22) Filed: Aug. 30, 2022

(65) Prior Publication Data

US 2024/0068514 A1 Feb. 29, 2024

(51) Int. Cl.
*F16H 48/38* (2012.01)
*F16H 57/00* (2012.01)

(52) U.S. Cl.
CPC .......... *F16H 48/38* (2013.01); *F16H 57/0031* (2013.01)

(58) Field of Classification Search
CPC ........ B60K 17/16; B60K 17/36; B60K 17/22; F16H 48/38; F16H 57/0031
See application file for complete search history.

(56) References Cited

U.S. PATENT DOCUMENTS

| | | | |
|---|---|---|---|
| 6,422,947 B1 * | 7/2002 | Kelly | B60K 17/24 464/178 |
| 8,398,520 B1 | 3/2013 | Bassi et al. | |
| 9,410,605 B2 | 8/2016 | Kluck | |
| 9,506,549 B2 | 11/2016 | Chandrashekar et al. | |
| 9,719,563 B2 | 8/2017 | Hirao | |
| 9,816,603 B2 | 11/2017 | Hayes et al. | |
| 10,113,628 B2 | 10/2018 | Kluck et al. | |
| 10,156,289 B2 | 12/2018 | De Stefani et al. | |
| 10,208,846 B2 | 2/2019 | Chinitz | |
| 10,364,872 B2 | 7/2019 | Keeney et al. | |
| 10,369,885 B2 | 8/2019 | Keeney et al. | |
| 10,378,634 B2 | 8/2019 | Kluck et al. | |
| 10,451,164 B2 * | 10/2019 | Chinitz | B60K 17/16 |
| 10,539,218 B2 | 1/2020 | Annigeri et al. | |
| 10,703,202 B2 | 7/2020 | Funderburg et al. | |
| 2003/0050126 A1 * | 3/2003 | Arnold | F16D 3/40 464/178 |

(Continued)

FOREIGN PATENT DOCUMENTS

| | | |
|---|---|---|
| CN | 2639057 Y | 9/2004 |
| EP | 2975276 A1 | 1/2016 |
| EP | 3807549 A | 4/2021 |

OTHER PUBLICATIONS

Extended European Search Report dated Jan. 4, 2024 for related European Appln. No. 23192180.0 7 Pages.

(Continued)

*Primary Examiner* — Jacob S. Scott
*Assistant Examiner* — Farhana Pervin
(74) *Attorney, Agent, or Firm* — Brooks Kushman PC (57) ABSTRACT

A unitary yoke-shaft and an axle assembly having a unitary yoke-shaft. The unitary yoke-shaft includes a shaft and a yoke. The shaft extends along an axis. The yoke extends from the shaft. The yoke is integrally formed with the shaft such that the yoke and the shaft are a unitary one-piece component.

20 Claims, 5 Drawing Sheets

(56) References Cited

U.S. PATENT DOCUMENTS

| | | | | |
|---|---|---|---|---|
| 2003/0130047 A1* | 7/2003 | Brissette | ............... | F16D 3/387 464/179 |
| 2005/0247148 A1* | 11/2005 | Slesinski | ............... | F16C 35/067 74/424 |
| 2018/0202497 A1* | 7/2018 | Lentini | ................... | F16D 3/387 |
| 2020/0055392 A1* | 2/2020 | Willyard | ................. | F16D 3/387 |
| 2020/0347922 A1* | 11/2020 | Raya | ....................... | F16H 48/40 |
| 2021/0291644 A1 | 9/2021 | Hayes et al. | | |

OTHER PUBLICATIONS

Ullagaddi et al.; U.S. Appl. No. 17/687,867, filed Mar. 7, 2022; 31 Pages.

\* cited by examiner

AXLE ASSEMBLY AND A UNITARY YOKE-SHAFT

TECHNICAL FIELD

This relates to unitary yoke-shaft and an axle assembly having a unitary yoke-shaft.

BACKGROUND

An axle assembly having yokes that are separate from and not unitary with a corresponding shaft is disclosed in U.S. Pat. No. 9,816,603.

SUMMARY

In at least one embodiment, a unitary yoke-shaft is provided. The unitary yoke-shaft includes a shaft and a yoke. The shaft extends along an axis. The yoke extends from the shaft. The yoke is integrally formed with the shaft as a unitary one-piece component.

The yoke may include a yoke end surface. The yoke end surface may encircle the axis. The yoke may include a pair of yoke arms. The yoke arms may extend from the yoke end surface.

The yoke may include a yoke cavity. The yoke cavity may be configured as a blind hole. The yoke cavity may extend from the yoke end surface toward the shaft. The yoke cavity may extend closer to the axis as a distance from the yoke end surface increases. The yoke cavity may be defined by a tapered cavity portion and a dome portion. The tapered cavity portion may extend from the yoke end surface toward the shaft. The tapered cavity portion may extend progressively closer to the axis as the distance from the yoke end surface increases. The dome portion may extend from the tapered cavity portion. The dome portion may define an end of the yoke cavity. The dome portion may be a continuously curved surface.

The yoke may include a step surface. The step surface may extend from the shaft in a direction that extends away from the axis. The step surface may encircle the axis. The step surface may be disposed substantially perpendicular to the axis.

The yoke may include a seal support surface. The seal support surface may extend from the step surface to a yoke arm. The seal support surface may encircle the yoke cavity. The seal support surface may be disposed substantially parallel to the axis.

The shaft may have a bearing support surface. The bearing support surface may extend from the step surface of the yoke. The bearing support surface may be disposed closer to the axis than the seal support surface of the yoke. The bearing support surface may encircle the axis. The bearing support surface may not encircle the yoke cavity.

The shaft may include a tapered portion. The tapered portion may extend progressively closer to the axis as the distance from the yoke or the yoke end surface increases.

The shaft may include a threaded portion. The threaded portion may extend between the bearing support surface and the tapered portion.

In at least one embodiment, an axle assembly is provided. The axle assembly includes an input shaft, a unitary yoke-shaft, and an interaxle differential unit. The input shaft is rotatable about an axis. The unitary yoke-shaft is rotatable about the axis. The unitary yoke-shaft includes a shaft and a yoke. The shaft extends along the axis. The yoke extends from the shaft. The yoke is integrally formed with the shaft as a unitary one-piece component. The interaxle differential unit operatively connects the input shaft to the shaft.

The axle assembly may include an axle housing. The axle housing may define a hole through which the unitary yoke-shaft extends.

The axle assembly may include a cup. The cup may be received in the hole in the axle housing. The cup may be fastened to the axle housing. The cup may define a cup retainer groove.

The axle assembly may include a first bearing assembly. The first bearing assembly may be disposed in the cup. The first bearing assembly may rotatably support the shaft. The first bearing assembly may be disposed on the bearing support surface.

The axle assembly may include a second bearing assembly. The second bearing assembly may be disposed in the cup. The second bearing assembly may rotatably support the shaft. The second bearing assembly may be disposed closer to the yoke than the first bearing assembly is disposed to the yoke. The second bearing assembly may be disposed on the bearing support surface.

The axle assembly may include a retainer. The retainer may be received in the cup retainer groove of the cup. The retainer may engage an outer race of the first bearing assembly.

The cup may include an inner surface. The inner surface may engage an outer race of the first bearing assembly. The inner surface may engage an outer race of the second bearing assembly.

The cup may have a cup step surface. The cup step surface may extend from the inner surface toward the axis. The outer race of the second bearing assembly may engage the cup step surface to inhibit axial movement of the outer race away from the first bearing assembly.

The axle assembly may include a spacer. The spacer may extend from the second bearing assembly to the step surface.

The axle assembly may include an outboard preload nut. The outboard preload nut may thread onto the threaded portion. The outboard preload nut may engage an inner race of the first bearing assembly.

The axle assembly may include an inboard preload nut. The inboard preload nut may thread onto the threaded portion. The inboard preload nut may engage the outboard preload nut. The outboard preload nut may extend from the inboard preload nut to the inner race of the first bearing assembly. The inboard preload nut may encircle the outboard preload nut. The retainer may encircle the outboard preload nut. The retainer may not encircle the inboard preload nut.

The cup may encircle a seal assembly that is disposed in the cup. The seal assembly may extend from the cup to the yoke. The seal assembly may encircle at least a portion of the yoke cavity.

DETAILED DESCRIPTION

As required, detailed embodiments of the present invention are disclosed herein. It is to be understood that the disclosed embodiments are merely exemplary and that various and alternative forms are possible. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments according to the disclosure.

It will also be understood that, although the terms first, second, etc. are, in some instances, used herein to describe various elements, these elements should not be limited by these terms. These terms are only used to distinguish one element from another. For example, a first element could be termed a second element, and similarly a second element could be termed a first element without departing from the scope of the various described embodiments. The first element and the second element are both elements, but they are not the same element.

The terminology used in the description of the various described embodiments is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
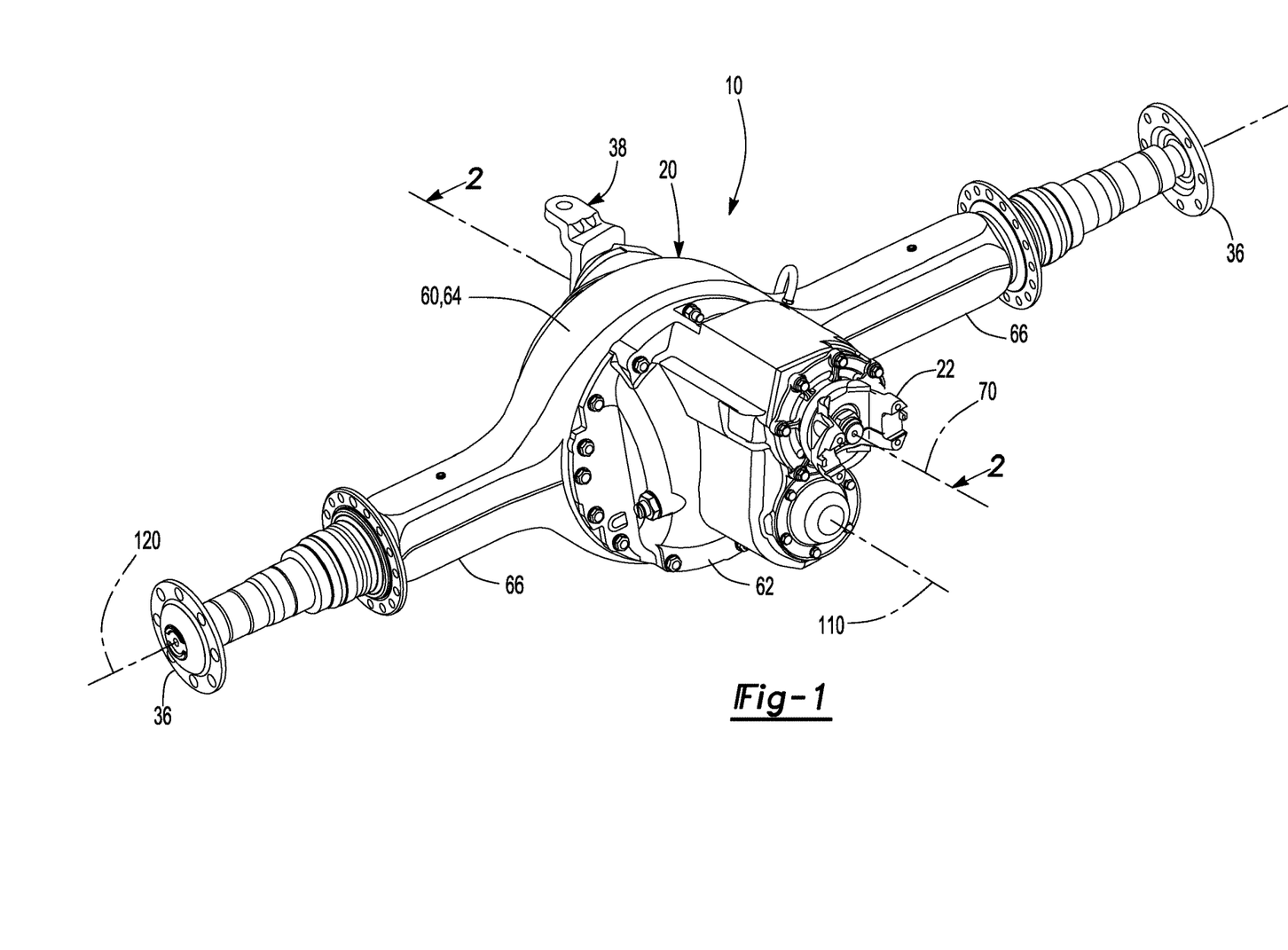
FIG. 1 is a perspective view of an example of an axle assembly.

Referring to FIG. 1, an example of an axle assembly 10 is shown. The axle assembly 10 may be provided with a vehicle of any suitable type, such as a truck, bus, farm equipment, military transport or weaponry vehicle, or cargo loading equipment for land, air, or marine vessels.

The axle assembly 10 may be part of a vehicle drivetrain that may include multiple axle assemblies that may be connected in series. For instance, the axle assembly 10 may be part of a tandem axle drivetrain configuration that may include two axle assemblies connected in series. The axle assembly 10 that is connected to at least one torque source, such as an electric motor or an internal combustion engine, or that is disposed closest to a torque source may be referred to as a first axle assembly. The axle assembly that receives propulsion torque from the torque source through or by way of the first axle assembly may be referred to as a second axle assembly. In FIG. 1, the axle assembly 10 is depicted as being a first axle assembly.

Figures 2, 3:
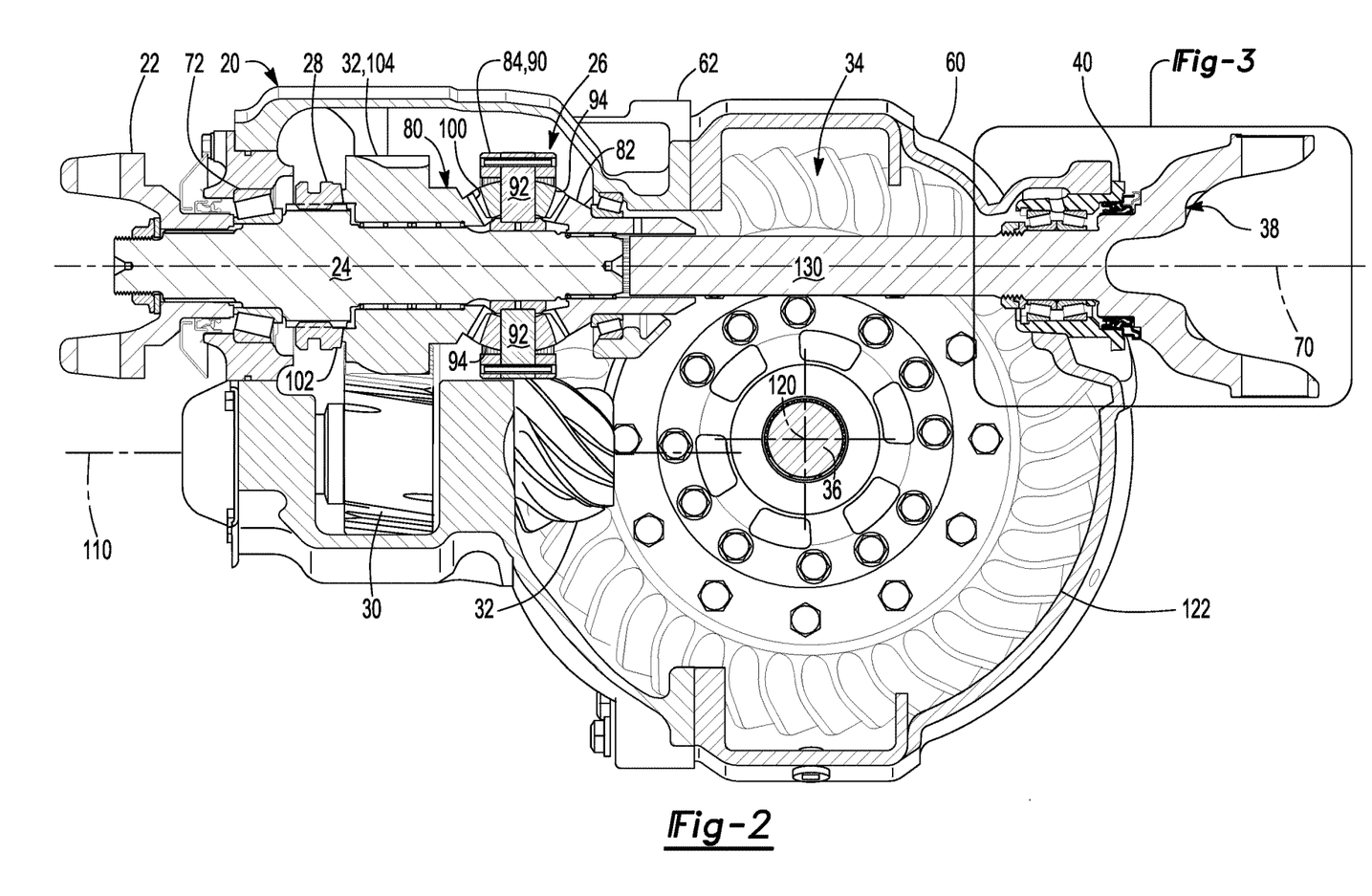
FIG. 2 is a section view of the axle assembly along section line 2-2.
FIG. 3 is a magnified view of a portion of FIG. 2.
Figure 3:
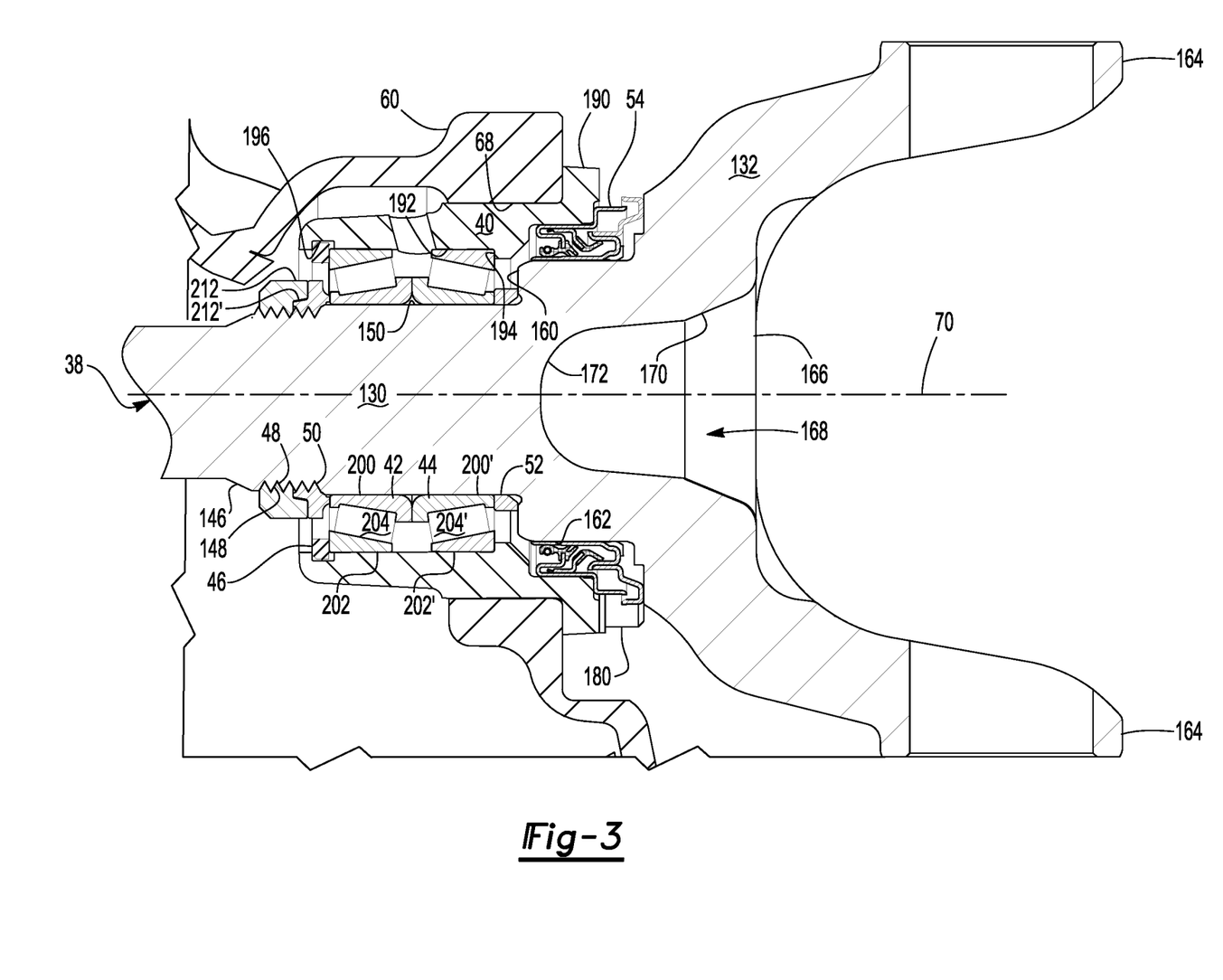

The axle assembly 10 provides torque to its associated wheel assemblies and may provide torque to the second axle assembly. In at least one configuration and as is best shown with reference to FIG. 2, the axle assembly 10 may include a housing assembly 20, an input yoke 22, an input shaft 24, an interaxle differential unit 26, a clutch collar 28, a driven gear 30, a drive pinion 32, a differential assembly 34, at least one axle shaft 36, and a unitary yoke-shaft 38. Referring to FIG. 3, the axle assembly 10 may also include a cup 40, a first bearing assembly 42, a second bearing assembly 44, a retainer 46, an inboard preload nut 48, an outboard preload nut 50, a spacer 52, a seal assembly 54, or combinations thereof.

Referring to FIG. 1, the housing assembly 20 receives various components of the axle assembly 10. In addition, the housing assembly 20 may facilitate mounting of the axle assembly 10 to the vehicle. In at least one configuration, the housing assembly 20 may include an axle housing 60 and a differential carrier 62.

The axle housing 60 is configured to receive and support the axle shafts 36. In at least one configuration, the axle housing 60 may include a center portion 64 and at least one arm portion 66. As is best shown in FIG. 3, the axle housing 60 may define a hole 68 through which the unitary yoke-shaft 38 extends.

Referring to FIG. 1, the center portion 64 may be disposed proximate the center of the axle housing 60. The center portion 64 may define a cavity that may at least partially receive the differential assembly 34, which is best shown in FIG. 2. A lower region of the center portion 64 may at least partially defines a sump portion that may contain or collect lubricant. Lubricant in the sump portion may be splashed or sprayed by a ring gear of the differential assembly 34 and distributed to lubricate various components.

Referring to FIG. 1, one or more arm portions 66 may extend from the center portion 64. For example, two arm portions 66 may extend in opposite directions from the center portion 64 and away from the differential assembly 34. The arm portions 66 may have substantially similar configurations. For example, the arm portions 66 may each have a hollow configuration or tubular configuration that may extend around and may receive a corresponding axle shaft 36 and may help separate or isolate the axle shaft 36 or a portion thereof from the surrounding environment. Each arm portion 66 may support a wheel hub and a brake assembly that is configured to brake the wheel hub and hence brake a wheel that is mounted to the wheel hub. An arm portion 66 or a portion thereof may or may not be integrally formed with the center portion 64. It is also contemplated that the arm portions 66 may be omitted.

Referring to FIGS. 1 and 2, the differential carrier 62 is removably mountable to the center portion 64 of the axle housing 60. The differential carrier 62 supports the differential assembly 34. For example, the differential carrier 62 may include one or more bearing supports that may support a roller bearing assembly that may rotatably support the differential assembly 34.

The input yoke 22, if provided, may facilitate coupling of the axle assembly 10 to a torque source. It is contemplated that the input yoke 22 may be omitted, such as when a torque source like an electric motor is integrated with the axle assembly 10. If provided, the input yoke 22 may be operatively connected to the input shaft 24. It is also contemplated that the input yoke 22 may be integrally formed with the input shaft 24 to provide a one-piece configuration similar to the unitary yoke-shaft 38.

Referring primarily to FIG. 2, an example of an input shaft 24 is shown. The input shaft 24 may extend along and may be rotatable about an axis 70. For example, the input shaft 24 may be rotatably supported by one or more bearings 72 that may be disposed on the housing assembly 20. The input shaft 24 may be operatively connected to the driven gear 30 and the unitary yoke-shaft 38 via the interaxle differential unit 26.

The interaxle differential unit 26 accommodates or compensates for rotational speed differences between different drive axle assemblies, such as speed differences between the axle assembly 10 and a second axle assembly that is connected in series with the axle assembly 10. As an example, the interaxle differential unit 26 may operatively connect the input shaft 24 to the unitary yoke-shaft 38 and may allow the input shaft 24 and unitary yoke-shaft 38 to rotate at different speeds with respect to each other under various operating conditions. The interaxle differential unit 26 may be provided in various locations. In FIG. 2, the interaxle differential unit 26 is disposed inside the housing assembly 20 on the input shaft 24. In at least one configuration, the interaxle differential unit 26 may include a first side gear 80, a second side gear 82, and a gear nest 84. The gear nest 84 may include a case 90, at least one pinion shaft 92, and at least one pinion gear 94.

The first side gear 80 is rotatable about the axis 70. In addition, the first side gear 80 is selectively couplable to the input shaft 24 with the clutch collar 28. Optionally one or more bearings may be received in the center bore and may rotatably support the first side gear 80 on the input shaft 24. In at least one configuration, the first side gear 80 may include side gear teeth 100, face gear teeth 102, and a drive gear 104.

The side gear teeth 100 may be arranged around the axis 70 and may mate or mesh with the teeth of at least one pinion gear 94.

The face gear teeth 102 may be disposed on an opposite side of the first side gear 80 from the side gear teeth 100. The face gear teeth 102 may be selectively engaged by the clutch collar 28.

The drive gear 104 may have teeth that may be arranged around the axis 70 and that may extend away from and face away from the axis 70. Teeth of the drive gear 104 may mate or mesh with teeth of driven gear 30.

The second side gear 82 is rotatable about the axis 70 with the unitary yoke-shaft 38. For example, the second side gear 82 may extend along the axis 70 and may have a center bore that may receive or encircle an end of the shaft of the unitary yoke-shaft 38. Optionally one or more bearings may be received in the center bore and may rotatably support the second side gear 82 on the input shaft 24. The center bore may also include a spline or splined portion that may be spaced apart from the input shaft 24 and that may mate with a corresponding spline of the shaft of the unitary yoke-shaft 38. As such, the second side gear 82 may be inhibited from rotating about the axis 70 with respect to the unitary yoke-shaft 38.

The case 90 may receive components of the gear nest 84 of the interaxle differential unit 26.

One or more pinion shafts 92 may the mounted to the case 90. Each pinion shaft 92 may rotatably support a pinion gear 94.

One or more pinion gears 94 may be provided with the gear nest 84. Each pinion gear 94 is rotatable with respect to the case 90 and is rotatable with respect to a corresponding pinion shaft 92. For instance, the pinion gear 94 may define a hole that may receive a corresponding pinion shaft 92 in a manner that permits the pinion gear 94 to rotate about the pinion shaft 92 and a corresponding center axis. The pinion gear 94 may have teeth that mesh or mate with the side gear teeth 100 of the first side gear 80 and may mesh or mate with teeth of the second side gear 82.

The clutch collar 28, if provided, is rotatable about the axis 70 with the input shaft 24. The clutch collar 28 is moveable along the axis 70 to engage or disengage a first side gear 80 of the interaxle differential unit 26.

The driven gear 30 may be rotatable about a second axis 110. For example, the drive pinion 32 may be received in a center bore of the driven gear 30 and the driven gear 30 may be fixedly disposed on the drive pinion 32 or may be couplable to the drive pinion 32 such that the driven gear 30 and the drive pinion 32 may rotate together about the second axis 110. The driven gear 30 may include a plurality of teeth that may be generally arranged about an outside diameter of the driven gear 30 and that may mate or mesh with the teeth of the drive gear 104. The second axis 110 may be disposed substantially parallel to the axis 70. The term "substantially parallel" as used herein means the same as or very close to parallel and includes features or axes that are within ±3° of being parallel each other.

The drive pinion 32 may help operatively connect the torque source to the differential assembly 34. The drive pinion 32 may be spaced apart from the input shaft 24 and may be configured to rotate about an axis, such as a second axis 110. The drive pinion 32 may be rotatable with the driven gear 30. A gear portion having teeth may be disposed at an end of the drive pinion 32. It is also contemplated that the drive pinion 32 may be disposed along the axis 70 in various configurations. For instance, the drive pinion 32 may be disposed along the axis 70 and the unitary yoke-shaft 38 may extend through a hole or passage in the drive pinion 32. In such a configuration, the driven gear 30 and drive gear 104 may be omitted.

The differential assembly 34 may be at least partially received in the housing assembly 20. The differential assembly 34 may be rotatable about an axis, such as a differential axis 120 that may be disposed substantially perpendicular to the second axis 110. The term "substantially perpendicular" is used herein to designate features or axes that are the same as or very close to perpendicular and includes features that are within ±3° of being perpendicular each other. The differential assembly 34 may transmit torque to the axle shafts 36 and wheels. For example, the differential assembly 34 may be operatively connected to the axle shafts 36 and may permit the axle shafts 36 to rotate at different rotational speeds in a manner known by those skilled in the art. The differential assembly 34 may have a ring gear 122 that may have teeth that may mate or mesh with the teeth of the gear portion of the drive pinion 32. Accordingly, the differential assembly 34 may receive torque from the drive pinion 32 via the ring gear 122 and transmit torque to the axle shafts 36.

Referring to FIGS. 1 and 2, the axle shafts 36 may transmit torque from the differential assembly 34 to corresponding wheel hubs and wheels. The axle shafts 36 may extend along and may be rotatable about an axis, which may be the differential axis 120. Each axle shaft 36 may have a first end and a second end. The first end may be operatively connected to the differential assembly 34. The second end may be disposed opposite the first end and may be operatively connected to a wheel.

Referring primarily to FIGS. 2 and 3, the unitary yoke-shaft 38 facilitates coupling of the axle assembly 10 to another axle assembly. The unitary yoke-shaft 38 is rotatable about the axis 70 and may extend from the interaxle differential unit 26 through the hole 68 in the axle housing 60. The unitary yoke-shaft 38 is a unitary one-piece component that may be made in any suitable manner. For instance, the unitary yoke-shaft 38 may be a forging that is made from a single piece of material or may be a cast part. The unitary yoke-shaft 38 includes a shaft 130 and a yoke 132.

Figure 4:
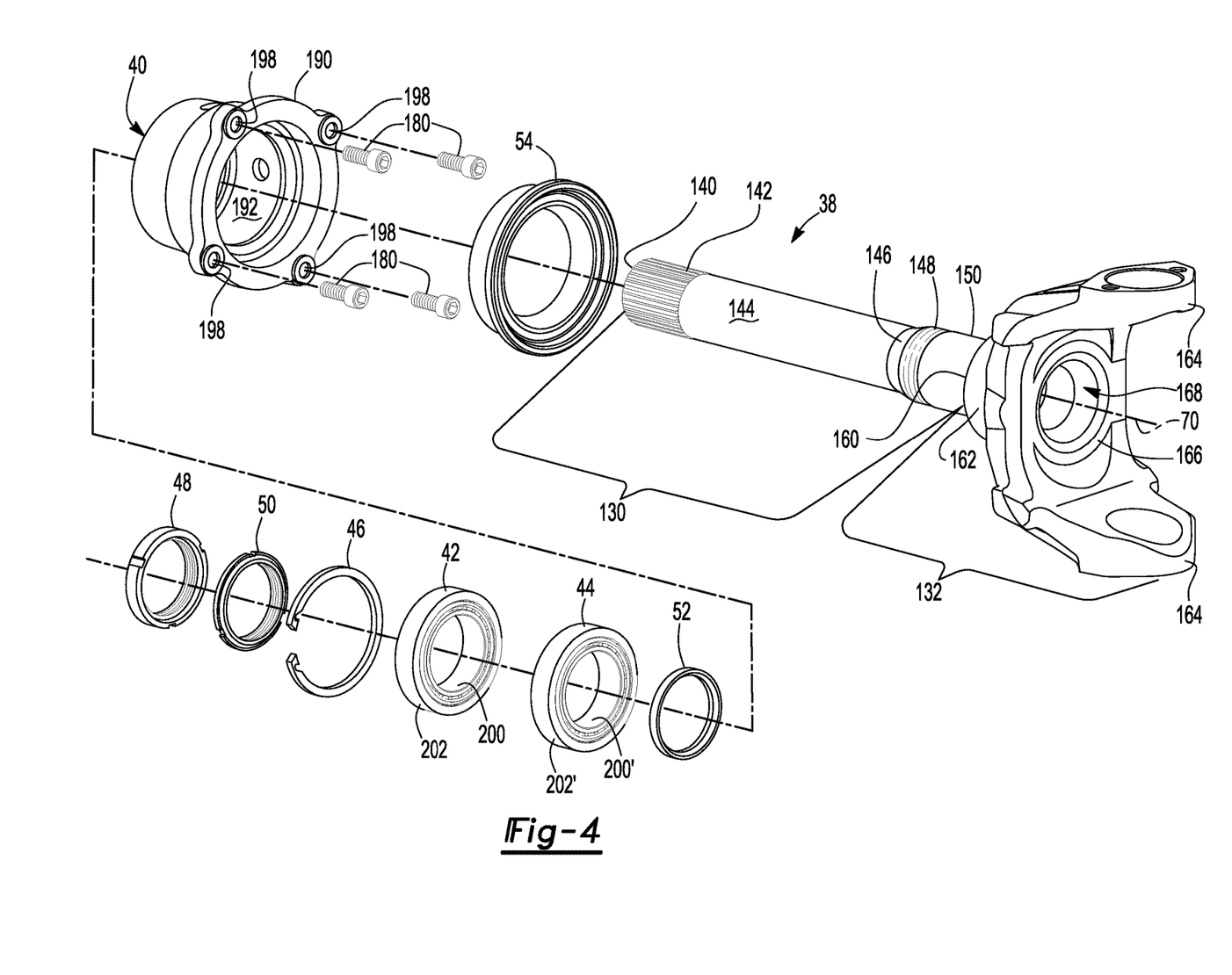
FIG. 4 is an exploded view of some components shown in FIG. 3.

Referring to FIGS. 3 and 4, the shaft 130 extends along the axis 70 and is rotatable about the axis 70. In at least one configuration and as is best shown in FIG. 4, the shaft 130 may include a first end 140, a shaft spline 142, a connecting portion 144, a tapered portion 146, a threaded portion 148, a bearing support surface 150, or combinations thereof.

The first end 140 is disposed at an end of the shaft 130 that is disposed opposite the yoke 132. As such, the first end 140 may face toward the input shaft 24 and the interaxle differential unit 26.

The shaft spline 142 may be disposed proximate the first end 140. The shaft spline 142 may facilitate coupling of the shaft 130 to the second side gear 82 and may include a plurality of spline teeth that may mate with corresponding spline teeth of the second side gear 82. It is also contemplated that the shaft spline 142 may be omitted and the shaft 130 may be coupled to the second side gear 82 in another manner, such as with one or more fasteners, a weld, or the like.

The connecting portion 144 may extend between the shaft spline 142 and the tapered portion 146. The connecting portion 144 may encircle the axis 70 and may have a cylindrical configuration.

The tapered portion 146 may extend between the connecting portion 144 and the threaded portion 148. In at least one configuration, the tapered portion 146 or a portion thereof may have a tapered conical configuration. As such, the tapered portion 146 may extend progressively further away from the axis 70 as the distance from the first end 140 increases. Conversely, the tapered portion 146 may extend progressively closer to the axis 70 as the distance from the yoke increases 132.

Referring primarily to FIGS. 3 and 4, the threaded portion 148 extends between the tapered portion 146 and the bearing support surface 150. The threaded portion 148 may include one or more threads that may facilitate installation of one or more preload nuts, such as the inboard preload nut 48 and the outboard preload nut 50.

The bearing support surface 150 supports one or more bearing assemblies that rotatably support the unitary yoke-shaft 38, such as the first bearing assembly 42 and the second bearing assembly 44. The bearing support surface 150 extends between the threaded portion 148 and the yoke 132. The bearing support surface 150 may encircle the axis 70 and may be disposed further from the axis 70 than the tapered portion 146. The bearing support surface 150 may not encircle the yoke 132.

The yoke 132 is integrally formed the shaft 130 such that the shaft 130 and the yoke 132 are a unitary one-piece component. The yoke 132 may extend from an end from an end or portion of the shaft 130 that is disposed opposite the first end 140. In at least one configuration, the yoke 132 may include a step surface 160, a seal support surface 162, a pair of yoke arms 164, a yoke end surface 166, a yoke cavity 168, or combinations thereof.

The step surface 160 extends from the shaft 130. For instance, the step surface 160 may extend from the bearing support surface 150 of the shaft 130 in a direction that extends away from the axis 70. For example, the step surface 160 may be disposed substantially perpendicular to the axis 70. The step surface 160 may encircle the axis 70.

The seal support surface 162 may engage and support the seal assembly 54. The seal support surface 162 may be disposed further from the axis 70 than the bearing support surface 150. The seal support surface 162 may extend from the step surface 160 toward or to the pair of yoke arms 164. The seal support surface 162 may face away from the axis 70 and may be disposed substantially parallel to the axis 70. The seal support surface 162 may encircle the axis 70 and may encircle the yoke cavity 168.

The yoke arms 164 may facilitate coupling of the unitary yoke-shaft 38 to another axle assembly. For instance, the yoke arms 164 may be coupled to a universal joint, which in turn may be coupled to a prop shaft that may connect the axle assembly 10 to another axle assembly that is connected in series. The yoke arms 164 may extend in a generally axial direction away from the seal support surface 162. In addition, the yoke arms 164 may extend further from the axis 70 than the seal support surface 162. The yoke arms 164 may extend from the yoke end surface 166.

The yoke end surface 166 may be disposed between the yoke arms 164. The yoke end surface 166 may encircle the axis 70 and may be disposed substantially perpendicular to the axis 70 in one or more configurations.

The yoke cavity 168 may extend from the yoke end surface 166 toward the shaft 130. As is best shown in FIG. 3, the yoke cavity 168 is configured as a blind hole. The yoke cavity 168 may extend closer to the axis 70 as the distance from the yoke end surface 166 increases. In at least one configuration, the yoke cavity 168 may be defined by a tapered cavity portion 170 and a dome portion 172.

The tapered cavity portion 170 may extend from the yoke end surface 166 toward the shaft 130. The tapered cavity portion 170 may extend closer or progressively closer to the axis 70 as the distance from the yoke end surface 166 increases.

The dome portion 172 may extend from the tapered cavity portion 170 and may define an end of the yoke cavity 168. The dome portion 172 may be continuously curved or may be a continuously curved surface. For instance, the dome portion 172 may have a hemispherical configuration or a non-hemispherical configuration, such as being configured as a portion of an ellipsoid, oblate ellipsoid, or the like. The dome portion 172 may be encircled by the seal support surface 162.

Referring to FIGS. 3 and 4, the cup 40 helps support the unitary yoke-shaft 38. The cup 40 may be mounted to the axle housing 60. For instance, the cup 40 may be received in the hole 68 in the axle housing 60. The cup 40 may be secured to the axle housing 60 or fastened to the axle housing 60 in any suitable manner, such as with one or more fasteners 180, such as bolts. The cup 40 may encircle the unitary yoke-shaft 38 and the axis 70. In at least one configuration, the cup 40 may include a cup flange 190, a cup inner side 192, a cup step surface 194, a cup retainer groove 196, or combinations thereof.

The cup flange 190 may facilitate mounting of the cup 40 to the axle housing 60. The cup flange 190 may be disposed at an end of the cup 40 and may extend away from the axis 70. The cup flange 190 may be disposed outside of the hole 68 in the axle housing 60. As is best shown in FIG. 4, the cup flange 190 may have one or more fastener holes 198 through which the fasteners 180 may extend.

Referring primarily to FIG. 3, the cup inner side 192 may face toward the axis 70. The cup inner side 192 or a portion thereof may encircle the axis 70 and may engage one or more bearing assemblies, such as the first bearing assembly 42 and the second bearing assembly 44. The cup inner side 192 may be spaced apart from the unitary yoke-shaft 38.

The cup step surface 194 may extend from the cup inner side 192 toward the axis 70. The cup step surface 194 may be axially positioned between the cup inner side 192 and the cup flange 190. In addition, the cup step surface 194 may be disposed in the hole 68 of the axle housing 60. The cup step surface 194 may engage the second bearing assembly 44 to inhibit axial movement of an outer race of the second bearing assembly 44.

The cup retainer groove 196 may extend from the cup inner side 192 in a direction that extends away from the axis 70. In addition, the cup retainer groove 196 may be disposed proximate an end of the cup 40 that is disposed opposite the cup flange 190. The cup retainer groove 196 may receive the retainer 46 in a manner that inhibits movement of the retainer 46.

The first bearing assembly 42 rotatably supports the shaft 130. The first bearing assembly 42 may be disposed inside the cup 40. The first bearing assembly 42 may encircle the shaft 130 and may extend from the shaft 130 to the cup 40. For instance, the first bearing assembly 42 may include an inner race 200, an outer race 202, and a plurality of bearing elements 204. The inner race 200 may encircle and engage the bearing support surface 150 of the shaft 130. The outer race 202 may encircle the inner race 200 and the bearing elements 204 and may engage the cup inner side 192. The bearing elements 204 may be disposed between the inner race 200 and the outer race 202 and may facilitate relative rotation of the inner race 200 and the outer race 202. The first bearing assembly 42 may be axially positioned further from the yoke 132 than the second bearing assembly 44 is disposed from the yoke 132. For example, the first bearing assembly 42 may extend in an axial direction between the second bearing assembly 44 and the outboard preload nut 50.

The second bearing assembly 44 may also rotatably support the shaft 130. The second bearing assembly 44 may be disposed inside the cup 40. The second bearing assembly 44 may encircle the shaft 130 and may extend from the shaft 130 to the cup 40. For instance, the second bearing assembly 44 may include an inner race 200', an outer race 202', and a plurality of bearing elements 204'. The inner race 200' may encircle and engage the bearing support surface 150 of the shaft 130. The outer race 202' may encircle the inner race 200' and the bearing elements 204' and may engage the cup inner side 192. The bearing elements 204' may be disposed between the inner race 200' and the outer race 202' and may facilitate relative rotation of the inner race 200' and the outer race 202'. The second bearing assembly 44 may be axially positioned closer to the yoke 132 than the first bearing assembly 42 is disposed to the yoke 132. For example, the first bearing assembly 42 may extend in an axial direction between the first bearing assembly 42 and the spacer 52.

Referring to FIGS. 3 and 4, the retainer 46 may be received in the cup retainer groove 196. The retainer 46 may have any suitable configuration. For instance, the retainer 46 may be configured as a clip, snap ring, or the like. The retainer 46 may engage the outer race 202 of the first bearing assembly 42 and inhibit axial movement of the outer race 202 in a direction that extends away from the yoke 132. The retainer 46 may encircle the outboard preload nut 50.

Figure 5:
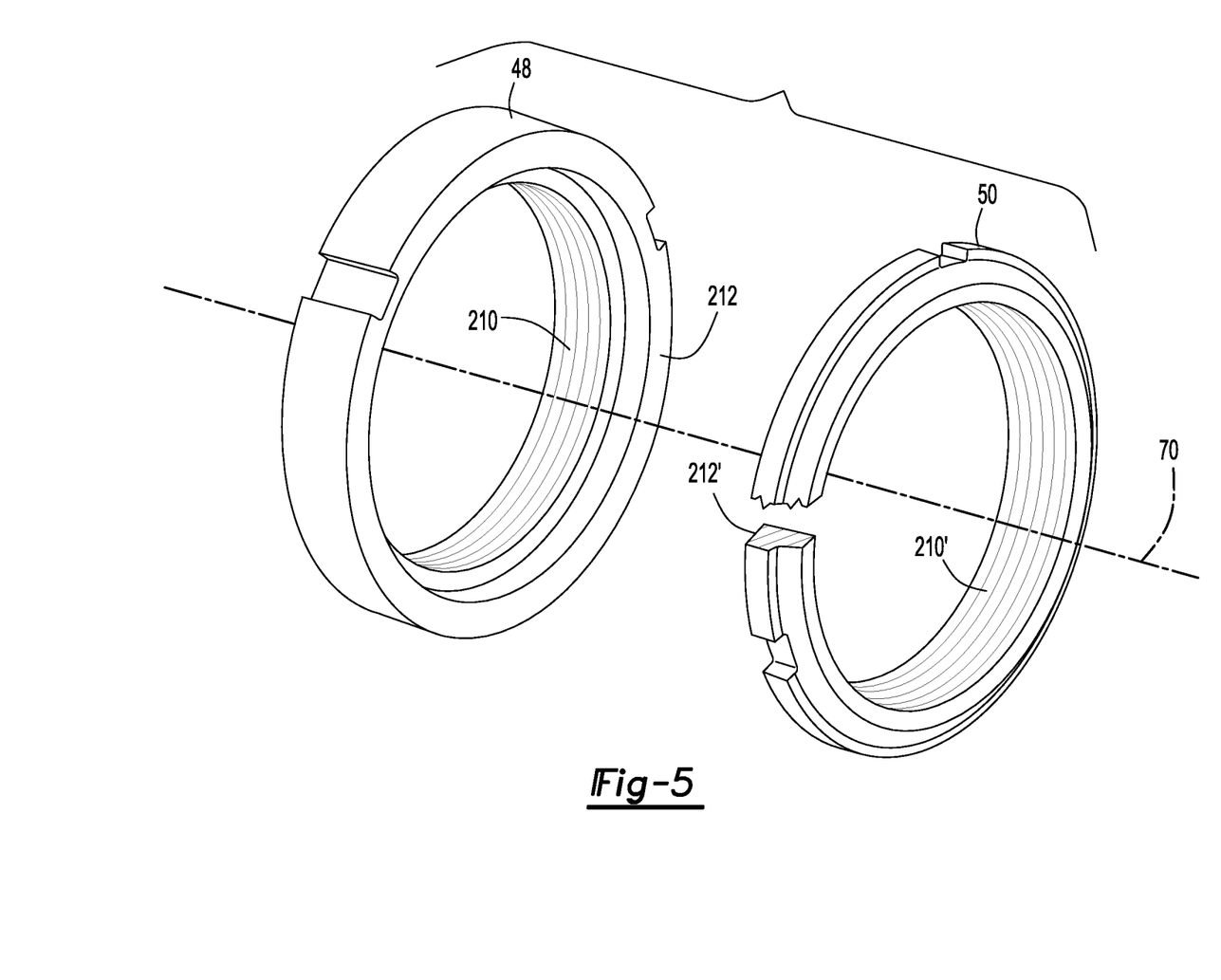
FIG. 5 is a magnified view of preload nuts that are shown in FIG. 4.

Referring primarily to FIGS. 3 and 5, the inboard preload nut 48 may encircle the shaft 130. The inboard preload nut 48 may have an internal threaded portion 210 that mates with the threaded portion 148 of the shaft 130. The inboard preload nut 48 may be axially positioned such that the inboard preload nut 48 is disposed further from the first bearing assembly 42 and the yoke 132 than the outboard preload nut 50. The inboard preload nut 48 may be spaced apart from the first bearing assembly 42. The inboard preload nut 48 may engage the outboard preload nut 50 to inhibit rotation of the outboard preload nut 50 and loosening of the outboard preload nut 50. In at least one configuration, a portion of the inboard preload nut 48 may encircle the outboard preload nut 50. For example, the inboard preload nut 48 may have an outer ring 212 that may be disposed further from the axis 70 than the internal threaded portion 210 and that may encircle a portion of the inboard preload nut 48.

The outboard preload nut 50 may encircle the shaft 130. The outboard preload nut 50 may have an internal threaded portion 210' that mates with the threaded portion 148 of the shaft 130. The outboard preload nut 50 may be axially positioned such that the outboard preload nut 50 is disposed between the first bearing assembly 42 and the inboard preload nut 48. For instance, the outboard preload nut 50 may extend from the first bearing assembly 42 to the inner race 200 of the first bearing assembly 42. The outboard preload nut 50 may be tightened against the inner race 200 of the first bearing assembly 42 to exert a preload force on the first bearing assembly 42, the second bearing assembly 44, or both. In at least one configuration, the outboard preload nut 50 may have an inner ring 212' that may extend toward the inboard preload nut 48 and may be encircled by the outer ring 212 of the inboard preload nut 48. The outer ring 212 may engage or contact the inner ring 212' to increase the friction between the inboard preload nut 48 and the outboard preload nut 50 to help inhibit or resist loosening of the outboard preload nut 50 after the outboard preload nut 50 has been tightened.

Referring to FIGS. 3 and 4, the spacer 52, if provided, extends between the second bearing assembly 44 and the yoke 132. For instance, the spacer 52 may extend from the inner race 200' of the second bearing assembly 44 to the step surface 160 of the yoke 132. The spacer 52 may have any suitable configuration. For example, the spacer 52 may be configured as a ring that may encircle a portion of the shaft 130, such as the bearing support surface 150.

The seal assembly 54 inhibits contaminants from entering the axle housing 60 by passing between the cup 40 and the yoke 132. The seal assembly 54 may be at least partially received inside the cup 40 and may encircle a portion of the yoke 132. For instance, the seal assembly 54 may extend from a portion of the cup inner side 192 that is disposed adjacent to the cup flange 190 to the seal support surface 162 of the shaft 130. As such, the seal assembly 54 may be encircled by the cup 40. As is best shown in FIG. 3, the seal assembly 54 may be axially positioned such that the seal assembly 54 encircles at least a portion of the yoke cavity 168.

A unitary yoke-shaft as described above may replace a yoke and shaft that are provided as separate components. As a result, components or features associated with assembling or attaching the yoke to the shaft may be eliminated. For instance, a splined connection between the yoke and the shaft may be eliminated which may help reduce manufacturing costs. In addition, a washer and a nut the secures the yoke to the shaft (which may be called a "yoke nut") may be eliminated, which may reduce weight, reduce complexity, eliminate manufacturing operations associated with providing a thread on the shaft for the nut, and eliminate assembly operations associated with mounting the yoke to the shaft, thereby reducing manufacturing and assembly costs. Providing a yoke that is integral with the shaft may also avoid upsetting or altering the preload force exerted on the bearing assemblies that support the shaft. For instance, providing a yoke that is separate from the shaft can result in axial movement of the yoke with respect to the shaft when the yoke nut is tightened to secure the yoke. More specifically, in a configuration in which the yoke and shaft are separate components the preload force exerted against the bearing assemblies that support the shaft is set before the yoke is mounted to the shaft. Subsequent installation of the yoke onto the shaft may exert force against the bearing assemblies that may alter the preload force that was previously set, which can result in reduced bearing life. The present invention avoids such issues since the yoke is integrally formed with the shaft and does not move with respect to the shaft.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A unitary yoke-shaft comprising:
   a shaft that extends along an axis, wherein the shaft comprises a tapered portion, a bearing support surface that encircles the axis, and a threaded portion that extends between the bearing support surface and the tapered portion; and
   a yoke that extends from the shaft, wherein the yoke is integrally formed with the shaft as a unitary one-piece component, wherein the yoke comprises a yoke end surface that encircles the axis, and a step surface that extends from the shaft in a direction that extends away from the axis and that encircles the axis, and wherein the bearing support surface extends from the step surface and the tapered portion extends progressively closer to the axis as a distance from the yoke end surface increases.

2. The unitary yoke-shaft of claim 1 wherein the yoke includes:
   a pair of yoke arms that extend from the yoke end surface; and
   a yoke cavity that is configured as a blind hole that extends from the yoke end surface toward the shaft.

3. The unitary yoke-shaft of claim 2 wherein the yoke cavity extends closer to the axis as a distance from the yoke end surface increases.

4. The unitary yoke-shaft of claim 2 wherein the yoke cavity is defined by a tapered cavity portion that extends from the yoke end surface toward the shaft and a dome portion that extends from the tapered cavity portion and defines an end of the yoke cavity.

5. The unitary yoke-shaft of claim 4 wherein the tapered cavity portion extends closer to the axis as a distance from the yoke end surface increases and the dome portion is a continuously curved surface.

6. The unitary yoke-shaft of claim 2 wherein the yoke includes:
   a seal support surface that extends from the step surface to the pair of yoke arms, wherein the seal support surface encircles the yoke cavity.

7. The unitary yoke-shaft of claim 6 wherein the step surface is disposed substantially perpendicular to the axis and the seal support surface is disposed substantially parallel to the axis.

8. The unitary yoke-shaft of claim 6 wherein the bearing support surface is disposed closer to the axis than the seal support surface, and the bearing support surface does not encircle the yoke cavity.

9. An axle assembly comprising:
   an input shaft that is rotatable about an axis;
   a unitary yoke-shaft that is rotatable about the axis, the unitary yoke-shaft comprising:
      a shaft that extends along the axis, wherein the shaft comprises a tapered portion, a bearing support surface that encircles the axis, and a threaded portion that extends between the bearing support surface and the tapered portion; and
      a yoke that extends from the shaft, wherein the yoke is integrally formed with the shaft as a unitary one-piece component, wherein the yoke comprises a yoke end surface that encircles the axis, and a step surface that extends from the shaft in a direction that extends away from the axis and that encircles the axis, and wherein the bearing support surface extends from the step surface and the tapered portion extends progressively closer to the axis as a distance from the yoke end surface increases; and
   an interaxle differential unit that operatively connects the input shaft to the shaft.

10. The axle assembly of claim 9 wherein the axle assembly includes:
    an axle housing that defines a hole through which the unitary yoke-shaft extends;
    a cup that is received in the hole and is fastened to the axle housing, the cup defining a cup retainer groove;
    a first bearing assembly that is disposed in the cup and that rotatably supports the shaft; and
    a second bearing assembly that is disposed in the cup and that rotatably supports the shaft, the second bearing assembly being disposed closer to the yoke than the first bearing assembly is disposed to the yoke; and
    a retainer that is received in the cup retainer groove and that engages an outer race of the first bearing assembly.

11. The axle assembly of claim 10 wherein the yoke includes:
    a pair of yoke arms that extend from the yoke end surface; and
    a yoke cavity that is configured as a blind hole that extends from the yoke end surface toward the shaft.

12. The axle assembly of claim 11 wherein the cup encircles a seal assembly that is disposed in the cup and that extends from the cup to the yoke.

13. The axle assembly of claim 9 wherein a first bearing assembly and a second bearing assembly are disposed on the bearing support surface and a spacer extends from the second bearing assembly to the step surface.

14. An axle assembly comprising:
    an input shaft that is rotatable about an axis;
    a unitary yoke-shaft that is rotatable about the axis, the unitary yoke-shaft including:
       a shaft that extends along the axis; and
       a yoke that extends from the shaft, wherein the yoke is integrally formed with the shaft as a unitary one-piece component;
    an interaxle differential unit that operatively connects the input shaft to the shaft;
    an axle housing that defines a hole through which the unitary yoke-shaft extends;
    a cup that is received in the hole and is fastened to the axle housing, the cup defining a cup retainer groove;
    a first bearing assembly that is disposed in the cup and that rotatably supports the shaft; and
    a second bearing assembly that is disposed in the cup and that rotatably supports the shaft, the second bearing assembly being disposed closer to the yoke than the first bearing assembly is disposed to the yoke; and
    a retainer that is received in the cup retainer groove and that engages an outer race of the first bearing assembly, wherein the cup includes an inner surface that engages the outer race of the first bearing assembly and an outer race of the second bearing assembly, and a cup step surface that extends from the inner surface toward the axis, wherein the outer race of the second bearing assembly engages the cup step surface to inhibit axial movement of the outer race away from the first bearing assembly.

15. The axle assembly of claim 14 wherein the shaft includes a bearing support surface upon which the first bearing assembly and the second bearing assembly are disposed, the yoke includes a step surface that extends from the bearing support surface in a direction that extends away from the axis, and a spacer extends from the second bearing assembly to the step surface.

16. The axle assembly of claim 15 wherein the shaft has a tapered portion that extends progressively closer to the axis as a distance from the yoke increases and a threaded portion that extends between the bearing support surface and the tapered portion.

17. The axle assembly of claim 16 further comprising an outboard preload nut that threads onto the threaded portion and engages an inner race of the first bearing assembly.

18. The axle assembly of claim 17 further comprising an inboard preload nut that threads onto the threaded portion and engages the outboard preload nut, wherein the outboard preload nut extends from the inboard preload nut to the inner race of the first bearing assembly.

19. The axle assembly of claim 18 wherein the inboard preload nut encircles the outboard preload nut.

20. The axle assembly of claim 18 wherein the retainer encircles the outboard preload nut but does not encircle the inboard preload nut.

\* \* \* \* \*